Figure 1:
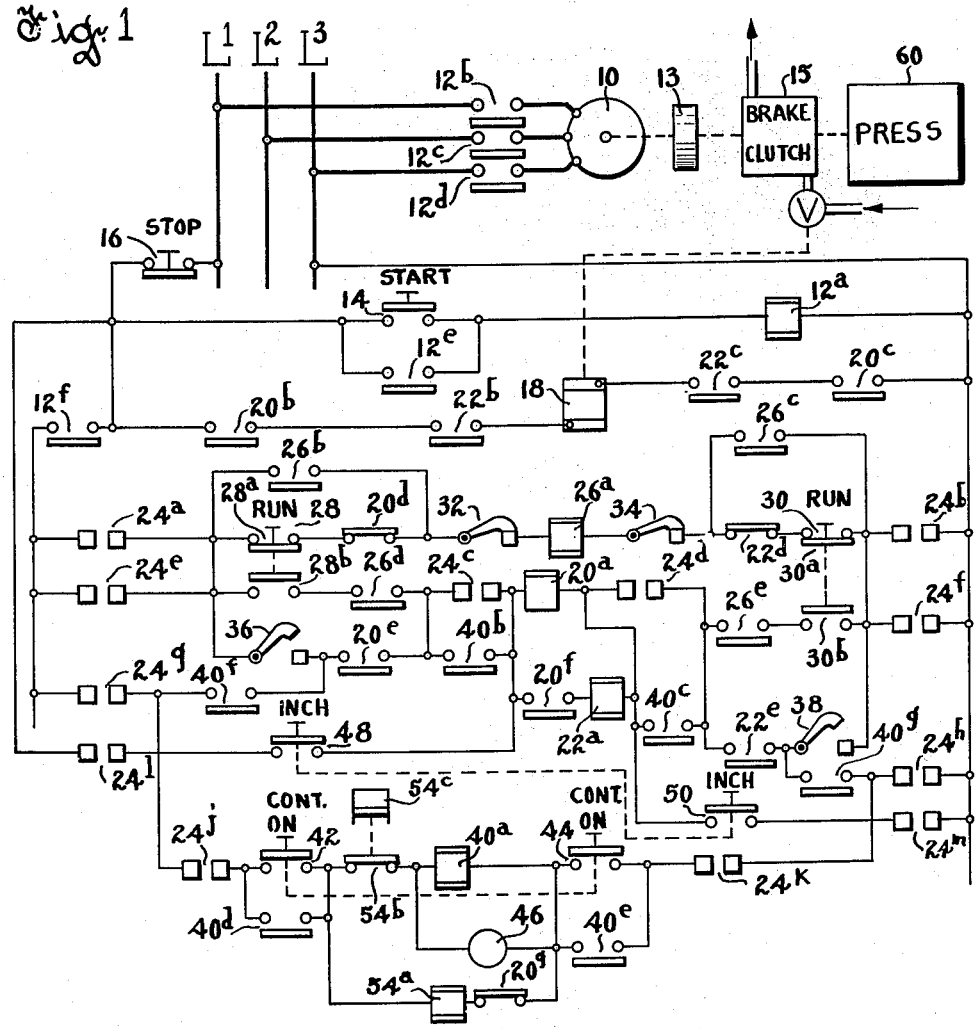

Nov. 8, 1960  
V. H. SIMSON  
2,959,263  
ELECTRIC CONTROLLER WITH SAFETY CIRCUIT  
FOR CONTINUOUS OPERATION  
Filed March 8, 1954  
2 Sheets-Sheet 1

Inventor  
Verne H. Simson

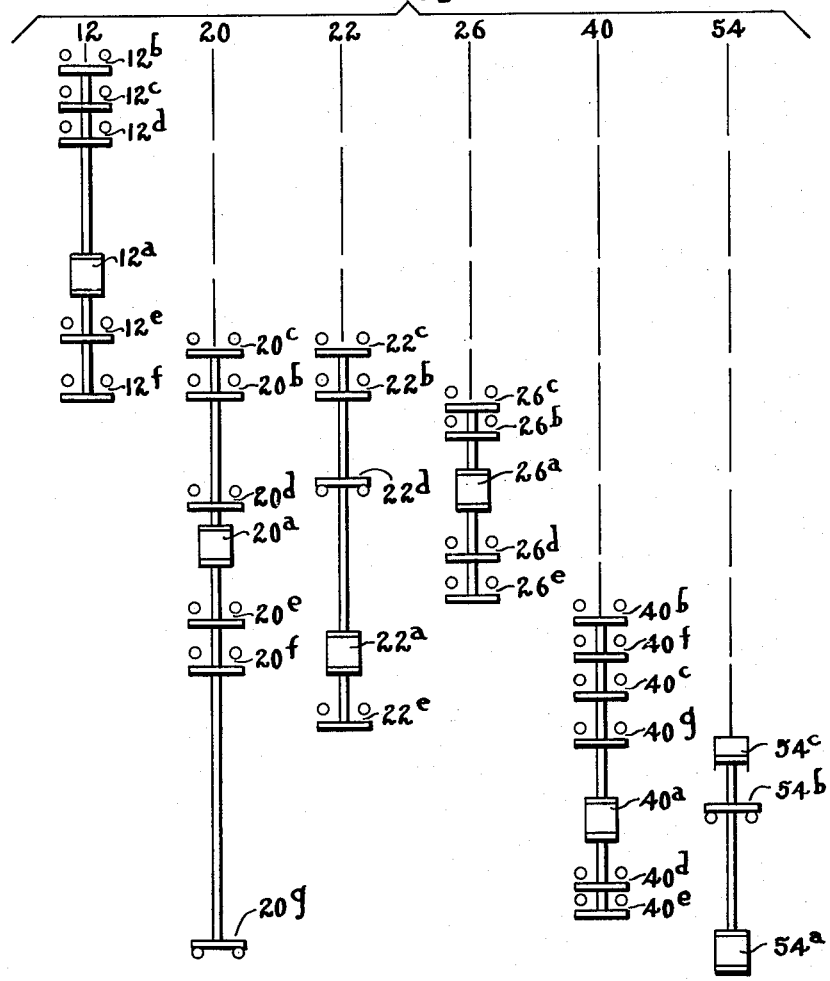
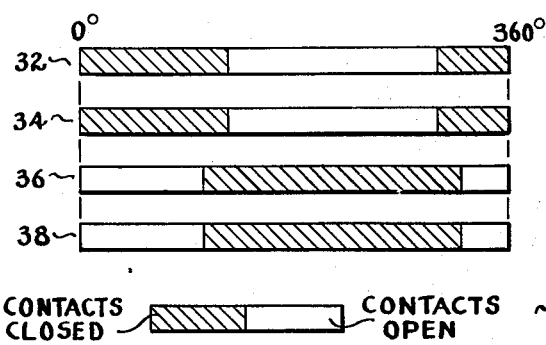

United States Patent Office 2,959,263
Patented Nov. 8, 1960

2,959,263

ELECTRIC CONTROLLER WITH SAFETY CIRCUIT FOR CONTINUOUS OPERATION

Verne H. Simson, Milwaukee, Wis., assignor to Cutler-Hammer, Inc., Milwaukee, Wis., a corporation of Delaware Filed Mar. 8, 1954, Ser. No. 414,721

8 Claims. (Cl. 192—129)

This invention relates to electric controllers and while not limited thereto is particularly applicable to controllers for power operated presses.

More specifically it relates to electrical control systems for machinery of the class in which a cycle of movement is performed; for example, power presses such as metal forming presses in which a ram or head moves in one direction from a starting position to perform a pressing operation on work pieces, and is then moved in the opposite direction to the starting position to complete the cycle; and the invention relates particularly to electrical control systems for controlling the power supplied to the machines to control the operation thereof, and to insure against undesired operations such as unintended continuous or repeat operation thereof, whereby an operator or operators at the machine might be injured or the machine or the work might be damaged.

Such control system may employ a clutch to transmit power from an electric motor to the machine to start and operate it and a brake to stop the machine. In such systems the brake and clutch, which may comprise individual units or a single unit, are caused to operate by pneumatic power under the control of an electromagnetically operated valve. The present invention pertains to a controller for controlling energization of the electromagnetically operated valve in such a manner as to minimize the likelihood of injury to an operator or damage to the machine.

It is among the objects of this invention to provide an improved control system for cyclically operating machines to insure that the machine will not run continuously when not so intended.

Another object is to provide an improved control system for cyclically operating machines, which control system under certain conditions automatically renders ineffective control settings for "continuous run" operation of the machine.

Another object is to provide an improved control system for cyclically operating machines, which control system requires the operator to make a certain manual control setting prior to each "continuous run" operation of the machine.

A more specific object is to provide an improved control system for cyclically operating machines, which system includes means for indicating to the operator whether or not the controller is set for "continuous run" operation.

Another more specific object is to provide a control system which requires the machine operator to initiate "continuous run" operation of the machine within a predetermined time interval following setting of the controller for "continuous run" operation.

Other objects will be apparent to those skilled in the art to which my invention pertains.

Figure 2:
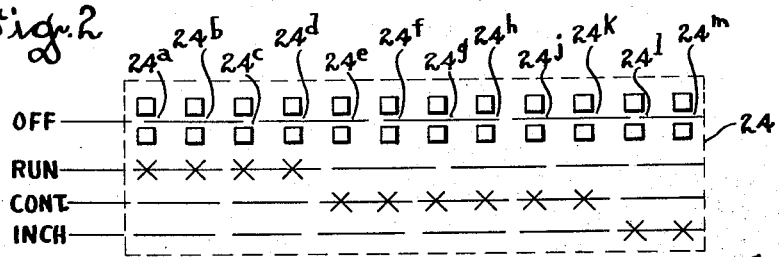

My invention is fully disclosed in the following description when read in connection with the accompanying drawings, in which:

Figure 1 is a diagrammatic view illustrating a control system embodying my invention, Fig. 2 is a diagrammatic view of a master controller or selector which may be used with the system of Fig. 1, Fig. 3 is a chart showing vertically alined each coil and its contacts shown in Fig. 1, and Fig. 4 is a diagrammatic view illustrating the cyclic sequence of operation of the limit switches shown in Fig. 1.

Like reference characters indicate corresponding parts throughout the several views of the drawings.

Referring to Fig. 1 it shows a press drive motor 10 connectable to power lines L1, L2 and L3 by means of normally open contacts $12^b$, $12^c$ and $12^d$ of a main contactor 12. Energizing winding $12^a$ of contactor 12 is connected across lines L1—L3 through a manually operable normally open "start" switch 14. A holding or maintaining circuit for said winding $12^a$ is provided by closure of normally open contacts $12^e$ in electrical parallel relation with "start" switch 14. A manually operable normally closed "stop" switch 16 is provided in line L1.

Fig. 1 shows the present invention as applied to a press 60, the drive motor of which is connected to a fly-wheel 13. Connection between fly-wheel 13 and press 60 is effected by means of a brake and clutch combination 15. Setting of the brake portion of said combination is effected in a well known manner by means of springs (not shown) to thus effect stopping of the press 60. The clutch is actuated by means of pneumatic power which in addition to effecting engagement between the press and the fly-wheel also overcomes the force of the brake springs, thereby permitting the press to be operated. An electromagnetic air valve having an energizing winding 18 is usually provided to control the fluid pressure necessary to operate the clutch and release the brake. Thus energization of winding 18 causes the clutch to effect engagement between the press and the fly-wheel and to release the brake, whereas deenergization thereof effects disengagement of the press and fly-wheel and sets the brake.

Winding 18 is connected between lines L1 and L3 through normally open contacts $20^b$ and $20^c$ of contactor 20 and normally open contacts $22^b$ and $22^c$ of contactor 22.

A four-position selector switch 24 is provided with contacts $24^a$, $24^b$, $24^c$ and $24^d$ for establishment of "run" connections of the control circuit; contacts $24^e$, $24^f$, $24^g$, $24^h$, $24^j$ and $24^k$ for establishment of "continuous run" connections; and $24^l$ and $24^m$ for establishment of "inching" connections of the control circuits to be hereinafter described.

A contactor 26 having an energizing winding $26^a$ connected across lines L1—L3 through contacts $24^a$, normally closed contacts $28^a$ of manually operable "run" switch 28, normally closed contacts $20^d$, limit switches 32 and 34, normally closed contacts $22^d$, normally closed contacts $30^a$ of manually operable "run" switch 30, and contacts $24^b$, is provided. Normally open contacts $26^b$ and $26^c$ of contactor 26 are connected in circuit as shown in Fig. 1 to establish a holding or maintaining circuit for winding $26^a$. "Run" switches 28 and 30 are provided for concurrent depression thereof by the operator to initiate operation of the press. Such switches are usually positioned far enough apart to require the operator to use both hands in effecting such simultaneous depression, thus causing him to keep both of his hands occupied while the press head or ram is moving downward. Such requirement, of course, substantially eliminates the likelihood of injury to the hands or arms of an operator.

Energizing winding $20^a$ of contactor 20 is connected between lines L1 and L3 through contacts $24^a$, normally open contacts $28^b$ of manually operable "run" switch 28, contacts $26^d$, $24^c$, $24^d$ and $26^e$, normally open contacts $30^b$ of "run" switch 30 and contacts $24^b$. As shown in Figure 1, one contact of each of said contacts 24ª and 24ᵉ are connected in parallel and one contact of each of contacts 24ᵇ and 24ᶠ are connected in parallel. Energizing winding 22ª of contactor 22 is adapted to be connected (through normally open contacts 20ᶠ when closed) in parallel with winding 20ª of contactor 20. Contacts 40ᵇ of a contactor 40 are connected in parallel circuit arrangement with contacts 24ᶜ, and contacts 40ᶜ of said contactor 40 are connected in parallel circuit arrangement with contacts 24ᵈ. As shown in Fig. 1 limit switch 36 and contacts 20ᵉ are arranged in series circuit relation with each other and are in a parallel circuit arrangement with respect to contacts 28ᵇ and 26ᵈ jointly. Also, limit switch 38 and contacts 22ᵉ are arranged in series relation with each other and are in a parallel circuit arrangement with respect to contacts 26ᵉ and 30ᵇ.

Contactor 40 is provided with an energizing winding 40ª connected across lines L1—L3 through contacts 24ᵍ and 24ʲ, manually operable normally open "continuous on" switch 42, normally closed contacts 54ᵇ of timing relay 54, "continuous on" switch 44, and contacts 24ᵏ and 24ʰ. Contacts 40ᵈ and 40ᵉ provide holding or maintaining circuits for winding 40ª. Connected in electrical parallel relation with winding 40ª and contacts 54ᵇ is the series circuit combination of winding 54ª of timing relay 54 and normally closed contacts 20ᵍ of contactor 20. In electrical parallel relation with winding 40ª is an indicating lamp 46, which is energized and deenergized simultaneously with winding 40ª. Connected between a point common to limit switch 36 and contacts 20ᵉ and a point common to contacts 24ᵍ and 24ʲ are normally open contacts 40ᶠ. Connected between a point common to contacts 22ᵉ and limit switch 38 and a point common to contacts 24ʰ and 24ᵏ are normally open contacts 40ᵍ.

Connected between line L1 and a point common to winding 20ª and contacts 24ᶜ, 40ᵇ and 20ᶠ are contacts 24ˡ and a manually operable normally open "inch" switch 48. Connected between line L3 and a point common to windings 20ª and 22ª and contacts 24ᵈ and 40ᶜ are contacts 24ᵐ and manually operable normally open "inch" switch 50.

Normally open contacts 12ᶠ are provided in line L1 to prevent the application of electrical power to certain of the control circuits until press drive motor 10 is energized.

Limit switches 32, 34, 36 and 38 are mechanically operated by movement of the head or ram of the press, and are arranged in pairs and operate in accordance with Fig. 4. The diagram of said Fig. 4 represents the sequence of operation of the above-mentioned limit switches during a single cycle of operation of the press ram. The cross-sectioned portions represent the times during which the respective switches are closed during the cycle and the blank or noncross-sectioned portions represent the times during which the respective switches are open. Thus when the ram is in its uppermost position (zero degrees) switches 32 and 34 are closed and switches 36 and 38 are open.

The above-mentioned timing relay 54 is provided with time delay means such as dashpot 54ᶜ (Fig. 3) to effect time opening of normally closed contacts 54ᵇ upon energization of winding 54ª, and instantaneous closure thereof in response to deenergization of said winding 54ª.

The improved controller of Fig. 1 operates as follows:
Momentary closure of "start" switch 14 effects energization of winding 12ª of contactor 12. Such energization of winding 12ª closes contacts 12ᵇ, 12ᶜ and 12ᵈ, thus connecting press drive motor 10 to power lines L1, L2 and L3. Energization of said winding 12ª also effects a maintaining circuit for itself by reason of closure of contacts 12ᵉ, and affords electrical current to the other control circuits due to closure of contacts 12ᶠ. At this point in the operation of the controller, the press drive motor is energized thus causing the fly wheel 13 to be rotated. The press ram, on the other hand, is held in a fixed position since the brake is set and the pneumatic clutch is not actuated.

In order for the press to be operated for a single cycle, selector switch 24 is set to "run" position, thus effecting closure of contacts 24ª, 24ᵇ, 24ᶜ and 24ᵈ. Closure of contacts 24ª and 24ᵇ effects energization of winding 26ª of contactor 26 through a circuit consisting of contacts 24ª, 28ª and 20ᵈ, limit switches 32 and 34 and contacts 22ᵈ, 30ª and 24ᵇ. A maintaining circuit is also provided for said winding 26ª due to closure of contacts 26ᵇ and 26ᶜ, thus permitting subsequent opening of contacts 28ª and 30ª without effecting deenergization of winding 26ª. As will be apparent from Fig. 4, limit switches 32 and 34 are closed when the press ram is in this, its uppermost, position.

When it is desired to effect downward movement of the press ram, it is necessary to simultaneously operate manual "run" switches 28 and 30. Momentary operation of said switches 28 and 30 effects energization of winding 20ª of contactor 20 through a circuit consisting of contacts 24ª, 28ᵇ, 26ᵈ, 24ᶜ, 24ᵈ, 26ᵉ, 30ᵇ and 24ᵇ. It will be noted that contacts 26ᵈ and 26ᵉ were previously closed due to energization of winding 26ª in response to movement of selector switch 24 to its "run" position.

Energization of winding 20ª affords closure of contacts 20ᵇ and 20ᶜ, thus partially completing the energizing circuit for winding 18 of the electromagnetic air valve. Such energization of winding 20ª also causes contacts 20ᵈ and 20ᵍ to open, and contacts 20ᵉ and 20ᶠ to close. Closure of contacts 20ᶠ affords energization of winding 22ª of switch 22, thus affording energization of winding 18 due to closure of contacts 22ᵇ and 22ᶜ. Such energization of winding 22ª also causes contacts 22ᵈ to open and contacts 22ᵉ to close.

As hereinbefore explained energization of winding 18 causes the pneumatic power to actuate the clutch to effect engagement between the fly-wheel and the press ram, and also to release the brake to permit the fly-wheel to cause the ram to move downward.

As will be noted in the diagram of Fig. 4, limit switches 36 and 38 remain open during the aforedescribed operations, thus affording immediate deenergization of winding 18 upon opening of contacts 28ᵇ or 30ᵇ due to release of either of the respective switches 28 or 30. When the press ram has moved a sufficient distance so that the operator can no longer place his hands between the ram and the work to be pressed, said limit switches 36 and 38 are closed thus by-passing contacts 28ᵇ and 30ᵇ respectively and permitting the operator to release "run" switches 28 and 30 without causing the press to be stopped.

As also shown in Fig. 4, limit switches 32 and 34 are opened by movement of the press ram after switches 36 and 38 are closed thus interrupting energization of winding 26ª. As previously pointed out energization of winding 20ª opens contacts 20ᵈ, and energization of winding 22ª opens contacts 22ᵈ, thus rendering release of switches 28 and 30 ineffective to reenergize winding 26ª when limit switches 32 and 34 are reclosed (Fig. 4) prior to deenergization of windings 22ª and 20ª due to subsequent opening of limit switches 36 and 38. It is thus seen that contacts 28ª and 30ª must be allowed to remain closed after the press ram has reached a position where limit switches 36 and 38 are opened. As will be noted, requiring such manipulation of switches 28 and 30 by the operator prevents causing the press to operate continuously by simply continuing to hold said switches 28 and 30 in their depressed positions.

To effect "continuous run" operation of the press it is first necessary to set selector switch 24 at "continuous run" position, thus closing contacts 24ᵉ, 24ᶠ, 24ᵍ, 24ʰ, 24ʲ and 24ᵏ. Following such positioning of selector switch 24, closure of "continuous on" switches 42 and 44 effects energization of winding 40ª through a circuit consisting of contacts 24ᵍ, 24ʲ, switch 42, contacts 54ᵇ, switch 44, and contacts 24ᵏ and 24ʰ. Maintaining or holding circuits are provided for said winding 40ª by closure of contacts 40ᵈ and 40ᵉ, thus permitting release of manual switches 42 and 44 without causing deenergization of winding 40ª. Energization of said winding 40ª of contactor 40 causes contacts 40ᵇ, 40ᶜ, 40ᶠ and 40ᵍ to close.

I prefer to connect an indicating lamp 46 in parallel circuit arrangement with winding 40ª to thereby afford visual indication that the controller is set up for "continuous run" operation.

Switch 24, in its "continuous run" position, effects energization of winding 26ª through a circuit consisting of contacts 24ᵉ, 28ª, 20ᵈ, limit switches 32 and 34, and contacts 22ᵈ, 30ª and 24ᶠ. Energization of winding 26ª affords closure of contacts 26ᵈ and 26ᵉ so that simultaneous closure of contacts 28ᵇ and 30ᵇ of manually operable "run" switches 28 and 30, affords energization of winding 20ª through a circuit consisting of contacts 24ᵉ, 28ᵇ, 26ᵈ, 40ᵇ, 40ᶜ, 26ᵉ, 30ᵇ and 24ᶠ. As heretofore explained energization of winding 20ª effects energization of winding 22ª due to closure of contacts 20ᶠ; said windings 20ª and 22ª thus effecting energization of winding 18 due to closure of contacts 20ᵇ, 20ᶜ, 22ᵇ and 22ᶜ. Energization of winding 20ª also effects closure of contacts 20ᵉ while energization of winding 22ª also closes contacts 22ᵉ, thus providing a maintaining circuit for both winding 20ª and 22ª through a circuit consisting of contacts 24ᵍ, 40ᶠ, 20ᵉ, 40ᵇ, 40ᶜ, 22ᵉ, 40ᵍ and 24ʰ. Thus only momentary closure of both manual switches 28 and 30 is necessary to initiate "continuous run" operation of the press, and subsequent operation of limit switches 36 and 38 has no effect on the energization of winding 18 due to the above-described maintaining circuit for windings 20ª and 22ª. Therefore the press will operate continuously thereby effecting repeat cycles until the controller is deenergized by momentary depression of "stop" switch 16.

Winding 18 of the electromagnetic air valve can also be deenergized while the press is operating under "continuous run" conditions by simply moving the selector switch 24 away from its "continuous run" position. This of course deenergizes winding 40ª, thus interrupting the aforementioned maintaining circuits for winding 20ª and 22ª. Under these conditions winding 18 would be deenergized immediately thus causing the press ram to immediately come to rest.

An important feature of this invention is that the operator is required to close switches 42 and 44 prior to each "continuous run" operation of the press irrespective of the manner in which the press was previously stopped. Such operation of switches 42 and 44 requires the operator to perform a special operation prior to each "continuous run" operation of the press, thereby making him aware that repeat cycles will occur and that it would be exceedingly hazardous for him to place his hands or arms near the press ram following the first cycle of operation.

It will be noted that winding 54ª of timing relay 54 is energized simultaneously with winding 40ª of contactor 40. Upon the expiration of a predetermined time interval following initiation of energization of winding 54ª, contacts 54ᵇ are caused to open thus deenergizing winding 40ª and removing the maintaining circuit therefor. On the other hand, if contact 20ᵍ is opened due to energization of winding 20ª of contactor 20, time relay winding 54ª will be deenergized and will have no effect on contacts 54ᵇ. In the last mentioned situation winding 40ª will not be deenergized and the "continuous run" operation will take place. In order to open contacts 20ᵍ it is necessary to commence the "continuous run" operation; which operation necessarily includes energization of winding 20.

It is to be understood that utilization of timing relay 54 requires the operator to commence the "continuous run" operation within a predetermined time interval following manual closure of "continuous on" switches 42 and 44. Therefore, whenever the press is caused to operate continuously the operator is aware of such fact due to the lapse of time between setting of the controller for "continuous run" operation and depression of the "start" switches 28 and 30.

Inching operation of the press can be effected by positioning switch 24 in its "inch" position, and then depressing "inch" switches 48 and 50 for a sufficient length of time to effect the desired amount of ram movement. Depression of switches 48 and 50 successively energizes windings 20ª, 22ª and 18 whereas release of either of said switches effects deenergization thereof.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. In a controller initiable to effect cyclic operation of a machine operable through a given cycle and including stopping means operable to stop the machine regardless of whether the machine is operated continuously or as a succession of single cyclic movements, single cycle control means incorporated in said controller to limit operation of the machine to a single cycle for each initiation of the controller, continuous cycle control means incorporated in said controller and acting when operated to render inoperative said single cycle control means, and means responsive to operation of said stopping means to render inoperative said continuous cycle control means until the latter is re-operated, whereby re-operation of said continuous cycle control means to render ineffective said single cycle control means is required after the machine has been stopped to effect continuous cyclic operation thereof.

2. The controller defined in claim 1 in which said continuous cycle control means comprises timing means operative to render said continuous cycle control means ineffective to render inoperative said single cycle control means unless operation of said controller is initiated within a selected time interval following operation of said continuous cycle control means.

3. The controller defined in claim 1, in which said single cycle control means comprises a first switch and means to operate the same in accordance with cyclic movement of the machine, and in which said continuous cycle control means comprises a manually controlled second switch and an electroresponsive contactor energizable through said stopping means and having an electrical maintaining circuit, said second switch having a contact connected in shunt circuit with said first switch, and in which said means to render said continuous cycle control means inoperative comprises another contact of said contactor connected in said electrical maintaining circuit for the contactor around said second switch.

4. The controller defined in claim 3 including manually controlled starting means to initiate operation thereof and timing means connected in circuit with said contactor and operative to interrupt energization of said contactor unless said starting means is operated within a selected time interval following operation of said second switch.

5. In a controller for power driven machines, in combination, means to effect cyclic operation of a machine and to limit operation of the machine to a single cycle for each initiation of the controller, means comprising first and second presettable means for presetting said controller to a position providing for automatically initiating repeat cycles of the machine, a starting switch operable for initiating operation of the machine whether set for single cycle operation or for repeat cycles, means responsive to said switch for effecting a single cycle operation of the machine when set therefor and for effecting repeat cycle operation of the machine when set for the latter, means operable at will for stopping the machine whether set for single cycle or repeat cycle operation, and means responsive to the last mentioned means to change the repeat cycle setting of said second presettable means when set therefor to prevent automatic initiation of repeat cycles in response to reoperation of said starting switch until said second presettable means is reset.

6. The combination with a controller for power driven machines which controller provides for operation of the machine through a given cycle but requires reinitiation of each such cycle, settable means for converting said controller from one providing for the aforementioned single-cycle operation to one providing for automatically initiating repeat cycles of the machine, means to start the machine comprising manually controlled starting means to initiate operation of the controller, said settable means comprising first and second manually controllable means, said second manually controllable means including timing means operative to render the same ineffective to convert said controller unless said starting means is operated within a selected time interval following setting of said settable means, stopping means operable at will regardless of the setting of said settable means, and means responsive to said stopping means for operating said second manually controllable means to a position requiring resetting of the latter in order to again provide for automatically initiating repeat cycles of the machine.

7. The combination with a controller for power driven machines which controller provides for operation of the machine through a given cycle but requires reinitiation of each such cycle, and said controller comprising switch means and means to operate at least a portion of said switch means in accordance with machine operation to limit machine operation to single cycles, of settable means for converting said controller from one providing for the aforementioned single cycle operation to one providing for automatically initiating repeat cycles of the machine, starting means comprising a manual switch and electroresponsive means operable to initiate repeat cycle operation of the machine after said settable means is set, stopping means operable at will regardless of the setting of said settable means, said settable means comprising a manually controlled switch and an electroresponsive contactor energizable through said stopping means and said manually controlled switch and having a contact in shunt circuit with said switch means first mentioned and another contact connected in an electrical maintaining circuit for said contactor around said manually controlled switch, and means responsive to said stopping means for operating said contactor to a position requiring resetting of the latter to enable said starting means to again initiate repeat cycle operation of the machine.

8. In a controller for power driven machines, the combination with means for operating the machine through a given cycle and automatically stopping the machine at the end of said cycle thereby requiring re-initiation of each such cycle, of means for presetting said controller to a position for automatically initiating repeat cycles of the machine, said presetting means comprising a selector switch and continuous-run switch means both of which must be preset before repeat cycle operation can be initiated, manual starting means operable for initiating automatic repeat cycle operation of the machine after said presetting means is preset, means operable at will for stopping the machine regardless of whether the controller is set for repeat cycle or single cycle operation, and means responsive to the last mentioned means for changing the setting of said continuous-run switch means to prevent reoperation of said manual starting means from initiating automatic repeat cycle operation until said continuous-run switch means is reset.

References Cited in the file of this patent

UNITED STATES PATENTS

| | | |
|---|---|---|
| 1,993,413 | Mellon | May 5, 1935 |
| 2,302,838 | Bundy | Nov. 24, 1942 |
| 2,639,796 | Dean | May 26, 1953 |
| 2,675,507 | Geiger | Apr. 13, 1954 |